No. 851,149. PATENTED APR. 23, 1907.
J. E. WOODBRIDGE & J. B. TAYLOR.
LEAKAGE INDICATOR FOR HIGH TENSION LINES.
APPLICATION FILED NOV. 21, 1904.

WITNESSES:
George A. Thornton
Helen Alford

INVENTORS:
Jonathan E. Woodbridge,
John B. Taylor,
By Albert G. Davis Att'y.

UNITED STATES PATENT OFFICE.

JONATHAN E. WOODBRIDGE, OF RUGBY, ENGLAND, AND JOHN B. TAYLOR, OF SCHENECTADY, NEW YORK, ASSIGNORS TO GENERAL ELECTRIC COMPANY, A CORPORATION OF NEW YORK.

LEAKAGE-INDICATOR FOR HIGH-TENSION LINES.

No. 851,149.  Specification of Letters Patent.  Patented April 23, 1907.

Application filed November 21, 1904. Serial No. 233,569.

*To all whom it may concern:*

Be it known that we, JONATHAN E. WOODBRIDGE, a citizen of the United States, residing at Rugby, England, and JOHN B. TAYLOR, a citizen of the United States, residing at Schenectady, county of Schenectady, State of New York, have invented certain new and useful Improvements in Leakage-Indicators for High-Tension Lines, of which the following is a specification.

Our present invention relates to means for detecting the leakage of current from electric transmission lines. It is more particularly useful in connection with those lines which have a grounded neutral. Where there is no grounded neutral or other ground, the leakage of current, due for example to the puncturing of an insulator, can be detected immediately by the usual static ground detector, and the line wire in trouble can be picked out in the usual way and cut out of service. The burning off of the insulator pin, crossarm, or pole is thus prevented; but in a system having a grounded neutral, such as those including Y connected windings with the center of the Y grounded, the ground detector fails to indicate leakage when it occurs. We have, however, devised an arrangement by which leakage of current from a transmission line may be indicated and the line on which leakage occurs picked out. This line may then be isolated from the others and the danger of destruction thereof eliminated.

Figure 2:
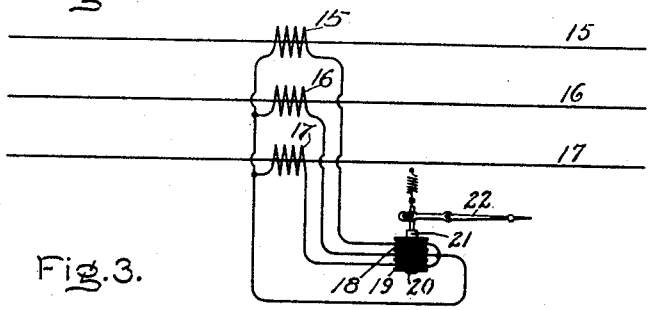
Figure 3:
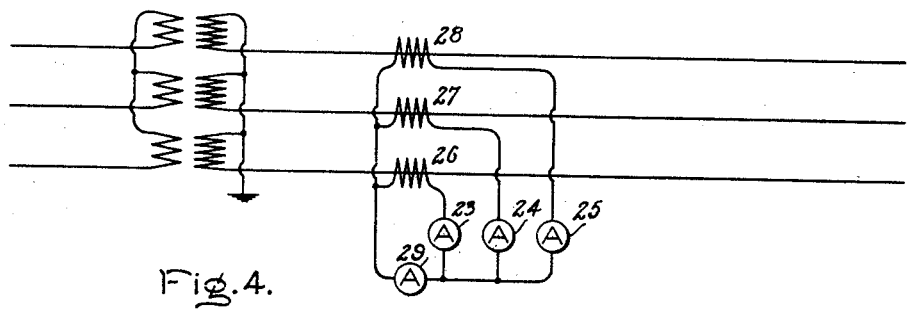

The features of novelty characteristic of our invention we have pointed out with particularity in the appended claims. The invention itself will, however, be better understood by reference to the following description taken in connection with the accompanying drawings, in which, Figures 1, 2 and 3 represent modified forms of our invention as applied in practice, and Fig. 4 an arrangement similar to Fig. 3 provided with a phase indicator for determining the transmission line upon which leakage occurs.

Figure 1:
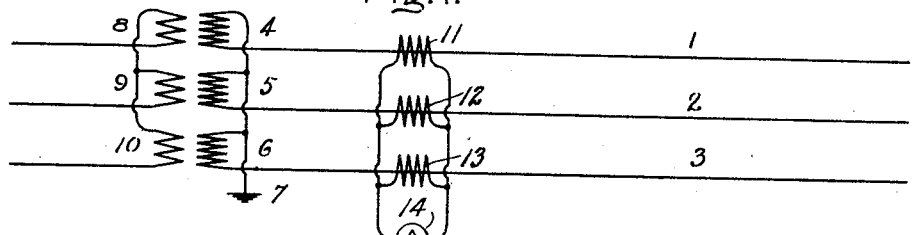

In Fig. 1 a three-phase transmission line is indicated by mains 1, 2 and 3. This transmission line is fed from the secondaries 4, 5 and 6 of a three-phase transformer. These secondaries are represented as Y connected and the junction point or neutral grounded at 7. The corresponding primary windings are indicated at 8, 9, and 10.

In order to detect leakage of current from a system such as described we provide a current transformer for each wire of the transmission line. The secondaries of these transformers are indicated at 11, 12 and 13 and are connected in multiple with each other, and also in multiple with an ammeter 14 or other current indicating device. As long as there is no leakage of current from the transmission lines 1, 2 and 3, it is obvious that the algebraic sum of the currents flowing at any instant in the primaries of the current transformers is zero. The secondary currents of the transformers will therefore exactly neutralize each other and no current will flow through the ammeter. If leakage to ground occurs on any wire of the transmission system the current will flow through the primary of the current transformer corresponding to that line and will not return through the primaries of the other transformers. The secondary currents from the current transformer will therefore no longer exactly balance each other and a resultant current will flow through the ammeter proportional to and in phase with the leakage current. No other current which does not escape to ground will give any indication on the ammeter, and for this reason the ammeter scale may, if desired, be made to indicate much smaller currents than those normally passing in the line.

In Fig. 1 current which is the resultant of the secondary currents is supplied to the ammeter 14. Instead of making the indicator an instrument responsive to a resultant current we may, of course, utilize the resultant magneto motive force of the individual currents. Thus in Fig. 2 the secondaries 15, 16 and 17, corresponding to the secondaries 11, 12 and 13 of Fig. 1, supply current respectively to the three magnetizing coils 18, 19 and 20, which all act upon a moving core 21 carrying a pointer 22. When there is no leakage in the transmission lines the resultant magneto motive force of these coils is zero. When, however, there is leakage, and the out-going and returning currents no longer balance each other, a resultant magneto motive force is produced in the coils 18, 19 and 20 and the pointer 22 correspondingly moved.

Our invention may be applied with but slight change to any system in which current transformers are used for supplying current indicating instruments. Thus in Fig. 3 the ammeters 23, 24 and 25 correspond to the ammeters usually employed for measuring current in the transmission lines and are connected respectively in series with the current transformers 26, 27 and 28. The currents from these ammeters are combined and, passing through the third ammeter 29, return through the current transformer secondaries. When there is no leakage on the transmission lines the resultant of the currents in the ammeters 23, 24 and 25 is zero and no indication is produced on the ammeter 29. When, however, leakage occurs a resultant current is produced which causes deflection of the indicating device 29 and indication is thus given of the fact that leakage is occurring on some one of the transmission lines.

Figure 4:
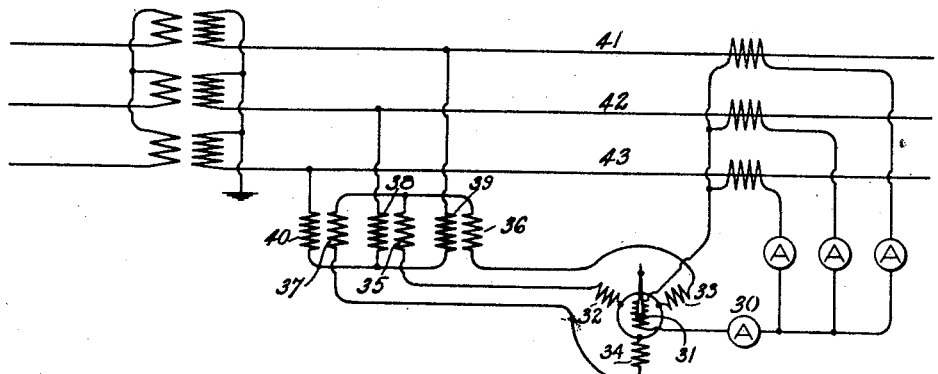

In order to determine which one of the transmission lines is grounded we may make use of any suitable phase indicator or indicators as we have, for example, represented in Fig. 4. In this figure current which traverses the ammeter 30 corresponding to the ammeter 29 in Fig. 3 is caused to traverse the winding 31 of one of the relatively movable members of a phase indicating device. The other member consists of equally spaced coils 32, 33 and 34, Y connected as indicated, and with their free terminals joined to Y connected secondaries 35, 36 and 37 of a set of potential transformers. The primaries 38, 39 and 40 of the potential transformers are Y connected across the transmission lines 41, 42 and 43. When leakage current shows upon the ammeter 30, the coil 31 in series therewith moves relatively to the other coils until it is in a position such that the maximum number of lines of force are linked between it and one of the stationary coils corresponding to the line upon which the leakage of current is occurring. This line may then be cut out of circuit and another substituted or the system shut down until repairs are made.

It is evident that numerous modifications may be made in the embodiment of our invention without departing from the spirit thereof, and that numerous fields of usefulness therefor may be found. For this reason we do not wish to be limited to the details shown and described nor to the application of the invention to the particular system indicated.

What we claim as new and desire to secure by Letters Patent of the United States, is,—

1. The combination of a normally grounded transmission system, and means inductively related to the system for indicating leakage from said system to ground.

2. In a leakage-indicating means for a normally grounded transmission system, means inductively related to the system for indicating the particular line in which leakage occurs.

3. The combination of the current-carrying conductors of an electric power or other transmission system, and an indicator actuated by a magnetomotive force varying as the resultant of the currents in the conductors.

4. The combination of the mains or conductors of an electric system, and indicating means responsive to a magnetomotive force varying as the algebraic sum of the out-going and return currents in said conductors.

5. In a leakage indicating means for transmission lines, the combination of a suitable current indicator, and means for producing a deflection of said indicator whenever the algebraic sum of the out-going and returning currents of the transmission line has at any instant a value other than zero.

6. The combination with the mains or leads of an electric current transmission system, of a ground connection to a neutral or other point on said system, and means inductively related to the system for indicating leakage from mains of said system to ground.

In witness whereof we have hereunto set our hands (Woodbridge) this first day of November 1904; and (Taylor) this 19th day of November 1904.

JONATHAN E. WOODBRIDGE.
JOHN B. TAYLOR.

Witnesses to Woodbridge:
  A. J. TANNER,
  H. D. JAMESON.

Witnesses to Taylor:
  HELEN ORFORD,
  G. C. HOLLISTER.